(12) United States Patent  (10) Patent No.: US 6,668,591 B2
Flynn  (45) Date of Patent: Dec. 30, 2003

(54) LIQUID COOLING OF GLASSWARE MOLDS

(75) Inventor: Robin L. Flynn, Waterville, OH (US)

(73) Assignee: Owens-Brockway Plastic Products Inc., Toledo, OH (US)

( * ) Notice: Subject to any disclaimer, the term of this patent is extended or adjusted under 35 U.S.C. 154(b) by 281 days.

(21) Appl. No.: 09/906,848

(22) Filed: Jul. 17, 2001

(65) Prior Publication Data

US 2003/0015002 A1 Jan. 23, 2003

(51) Int. Cl.⁷ .................................................. C03B 9/38
(52) U.S. Cl. ............................. 65/265; 65/267; 65/355; 65/356; 65/360; 65/361
(58) Field of Search .......................... 65/83, 111, 265, 65/267, 319, 355, 356, 360, 361; 249/29, 81, 155, 169

(56) References Cited

U.S. PATENT DOCUMENTS

| 1,798,136 A | 3/1931 | Barker, Jr. |
| 1,800,191 A | 4/1931 | Lorenz |

(List continued on next page.)

FOREIGN PATENT DOCUMENTS

| DE | 3123488 | 11/1982 |
| EP | 0141288 | 8/1985 |
| EP | 0184394 | 6/1986 |
| EP | 0612699 | 8/1994 |
| EP | 0576745 | 1/1996 |
| EP | 1084994 | 12/2001 |
| FR | 2237156 | 7/1973 |
| FR | 2346294 | 12/1975 |
| FR | 2260076 | 1/1978 |
| GB | 2060603 | 7/1983 |
| GB | 2256868 | 12/1992 |
| WO | 9003789 | 1/1999 |

OTHER PUBLICATIONS

"Axial Cooling," Owens–Illinois, date unknown.
Ductile Iron Date for Design Engineers (1990) p. 134 and 5–1 to 5–18.
Hanrez–Belgium Patent Application (translation) "Molding Structure having Continuously Adjustable Thermal Resistance" (1980).

Primary Examiner—Steven P. Griffin
Assistant Examiner—Carlos Lopez

(57) ABSTRACT

A system for cooling molds in a glassware forming machine includes a pair of mold arms mounted on a hinge post for movement toward and away from each other, and at least one mold part carried by each mold arm and adapted to cooperate with each other to form a glassware blank mold or blow mold. Each mold part includes at least one coolant passage having an inlet and an outlet disposed at one end of the mold part, and each mold arm has inlet and outlet coolant flow passages operatively coupled to the inlet and outlet of the mold part mounted on that arm. A liquid coolant source and a liquid coolant return are disposed adjacent to the hinge post. A first coolant passage extends through the hinge post between the coolant source and the inlet flow passages in the mold arms, and a second coolant passage extends through the hinge post between the outlet coolant flow passages in the mold arms and the coolant return. Thus, liquid coolant flows in a closed path from the source through the hinge post and the mold arms to the mold parts, and from the mold parts back through the mold arms and the hinge post to the return.

13 Claims, 6 Drawing Sheets

U.S. PATENT DOCUMENTS

| | | |
|---|---|---|
| 2,405,475 A | 8/1946 | Voreaux |
| 2,508,891 A | 5/1950 | Rowe |
| 2,744,358 A | 5/1956 | Rowe |
| 3,094,404 A | 6/1963 | Lauck |
| 3,249,418 A | 5/1966 | Irwin et al. |
| 3,499,746 A | 3/1970 | Blankenship et al. |
| 3,499,776 A | 3/1970 | Baak et al. |
| 3,586,491 A | 6/1971 | Mennitt |
| 3,653,870 A | 4/1972 | Foster et al. |
| 3,731,650 A | 5/1973 | Schweikert et al. |
| 3,849,101 A | 11/1974 | Wythe et al. |
| 3,887,350 A | 6/1975 | Jenkins |
| 4,070,174 A | 1/1978 | Nebelung et al. |
| 4,124,884 A | 11/1978 | Episcopo |
| 4,140,512 A | 2/1979 | Carmi et al. |
| 4,142,884 A | 3/1979 | Jones, Jr. |
| 4,251,253 A | 2/1981 | Becker et al. |
| 4,313,751 A | 2/1982 | Torok |
| 4,361,434 A | 11/1982 | Schneider |
| 4,362,544 A | 12/1982 | Mallory |
| 4,388,099 A | 6/1983 | Hermening et al. |
| 4,490,164 A | 12/1984 | Nebelung et al. |
| 4,561,875 A | 12/1985 | Foster |
| 4,578,104 A | 3/1986 | Jones |
| 4,655,813 A | 4/1987 | Nebelung |
| 4,701,203 A | 10/1987 | Schneider |
| 4,750,929 A | 6/1988 | Bolin |
| 4,824,461 A | 4/1989 | Cavazos |
| 4,842,637 A | 6/1989 | Bolin et al. |
| RE34,048 E | 9/1992 | Bolin |
| 5,167,688 A | 12/1992 | Cavazos |
| 5,304,229 A | 4/1994 | Swanfeld |
| 5,330,551 A | 7/1994 | Bolin |
| 5,364,437 A | 11/1994 | Bolin |
| 5,505,758 A | 4/1996 | Grueninger |
| 5,505,759 A | 4/1996 | Meyer et al. |
| 5,516,352 A | 5/1996 | Bogert et al. |
| 5,656,051 A | 8/1997 | Mares-Benavides |
| 6,442,976 B1 * | 9/2002 | Flynn .......................... 65/265 |

\* cited by examiner

LIQUID COOLING OF GLASSWARE MOLDS

The present invention is directed to the cooling of molds in a glassware forming machine, and more particularly to liquid cooling of the blank molds and/or blow molds in an individual section machine.

BACKGROUND AND OBJECTS OF THE INVENTION

The science of glass container manufacture is currently served by the so-called individual section machine. Such machines include a plurality of separate or individual manufacturing sections, each of which has a multiplicity of operating mechanisms for converting one or more charges or gobs of molten glass into hollow glass containers and transferring the containers through successive stations of the machine section. Each machine section includes one or more blank molds in which glass gobs are initially formed in a blowing or pressing operation, an invert arm for transferring the blanks to blow molds in which the containers are blown to final form, tongs for removing the formed containers onto a deadplate, and a sweepout mechanism for transferring molded containers from the deadplate onto a conveyor. U.S. Pat. No. 4,362,544 includes a background discussion of both blow-and-blow and press-and-blow glassware forming processes, and discloses an electropneumatic individual section machine adapted for use in either process.

In the past, the blank and blow molds of a glassware forming machine have generally been cooled by directing air onto or through the mold parts. Such techniques increase the temperature and noise level in the surrounding environment, and consume a substantial amount of energy. Furthermore, productivity is limited by the ability of the air to remove heat from the mold parts in a controlled manner, and process stability and container quality are affected by difficulties in controlling air temperature and flow rate. It has been proposed in U.S. Pat. Nos. 3,887,350 and 4,142,884, for example, to direct a fluid, such as water, through passages in the mold parts to improve heat extraction. However, heat extraction by liquid cooling can be too rapid and uncontrolled, at least in some areas of the mold, so steps must be taken to retard heat transfer from the inner or forming surface of a mold part to the outer periphery in which the liquid cooling passages are disposed. Various techniques for so controlling liquid-coolant heat extraction have been proposed in the art, but have not been entirely satisfactory.

U.S. application Ser. No. 09/400,123, filed Sep. 20, 1999 and assigned to the assignee hereof, discloses a system and method for cooling the forming molds in a glassware forming machine, in which each mold includes a body of heat conductive construction having a central portion with a forming surface for shaping molten glass and a peripheral portion spaced radially outwardly of the central portion. A plurality of coolant passages extend in a spaced array around the peripheral portion of the mold body, and liquid coolant is directed through such passages for extracting heat from the body by conduction from the forming surface. A plurality of openings extend axially into the body radially between at least some of the liquid coolant passages and the forming surface for retarding heat transfer from the forming surface to the liquid coolant passages. The openings have a depth into the mold body, either part way or entirely through the mold body, coordinated with the contour of the forming surface and other manufacturing parameters to control heat transfer from the forming surface to the coolant passages. The openings may be wholly or partially filled with material for further tailoring heat transfer from the forming surface to the coolant passages. The mold body is constructed of austenitic Ni-Resist ductile iron having elevated silicon and molybdenum content. Endplates are carried by the mold body for controlling flow of coolant in multiple passes through the coolant passages. The mold may be either a blank mold or a blow mold.

U.S. application Ser. No. 09/513,049, filed Feb. 24, 2000 and assigned to the assignee hereof, discloses a system and method of cooling glassware molds by directing liquid coolant to the blank or blow mold halves of a glassware forming machine through an enclosed pivotal rotary union-type structure. A cooling manifold is carried by each pivotal mold arm, and communicates with coolant inlet and outlet ports at the lower end of each mold part. The manifold is connected by a floating shaft seal, a rotary union assembly and a crank arm to a coolant source and a coolant return in the section box of the associated machine section. Each pivotal connection—i.e., between the section box and the crank arm, between the crank arm and the rotary union assembly, and between the rotary union assembly and the floating shaft seal—comprises a bi-directional rotary union for feeding liquid coolant to the manifolds and mold parts, and returning coolant from the manifolds and mold parts. Dynamic floating seals between the coolant manifolds and the mold parts, and between the coolant manifolds and the rotary union mechanisms, accommodate relative motion between these components as the mold parts are opened and closed.

Although the systems and methods for cooling molds in a glassware forming machine disclosed in the noted applications address problems theretofore extant in the art, further improvements remain desirable. In particular, it is desirable to remove all fluid hoses and other fluid coupling mechanisms external to the mold arms. The liquid coolant flows at elevated temperature, and it is highly desirable to reduce potential damage and leaks in the coolant flow path under the harsh environmental operating conditions of a glassware forming system. Molten glass, abrasive glass particles and spent lubricants can cause damage to the hosing, tubing and rotary fittings. The hoses, tubing and fittings can become loosened or fatigued due to the harsh operating conditions and severe vibration forces during normal operation, and impede rapid maintenance, repair and replacement of the mold parts and operating mechanisms. It is therefore a general object of the present invention to provide a system and method for cooling either the blank molds or the blow molds in a glassware forming machine, in which the coolant flow passages are entirely enclosed within the machine components, and protected from abrasion and fatigue under the harsh operating conditions of a glassware forming system.

SUMMARY OF THE INVENTION

Briefly stated, the presently preferred system and method of the invention direct liquid coolant to the blank or blow mold parts or halves of a glassware forming machine by means of source and return coolant passages that extend through a hinge post on which the mold arms are mounted, and through the mold arms to and from each mold part. In the preferred embodiments of the invention, a manifold is carried beneath each mold arm, and the coolant passages in the mold arms extend through the manifold to and from the respective mold parts. A system for cooling molds in a glassware forming machine in accordance with the present invention thus includes a pair of mold arms mounted on a hinge post for movement toward and away from each other, and at least one mold part carried by each mold arm and adapted to cooperate with each other to form a glassware blank mold or blow mold. Each mold part includes at least one liquid coolant passage having an inlet and an outlet disposed at one end of the mold part, and each mold arm has inlet and outlet coolant flow passages operatively coupled to the inlet and outlet of the mold part mounted on that arm. A liquid coolant source and a liquid coolant return are disposed in fixed position adjacent to the hinge post. A first coolant passage extends through the hinge post between the coolant source and the inlet flow passages in the mold arms, and a second coolant passage extends through the hinge post between the outlet coolant flow passages in the mold arms and the coolant return. Thus, liquid coolant flows in a closed path from the source through the hinge post and the mold arms to the mold parts, and from the mold parts back through the mold arms and the hinge post to the return.

The hinge post preferably includes an elongated cylindrical portion on which the mold arms are pivotally mounted. Both of the first and second coolant passages include a first portion that extends axially within the hinge post, and a second portion that extends radially to a circumferential face of the cylindrical portion of the hinge post. The inlet and outlet coolant flow passages in the mold arms include portions in axial registry and radial alignment with the second portions of the first and second coolant passages for delivering coolant from and to the hinge post independent of pivotal position of the mold arms on the hinge post. Seals are carried by the mold arms in sealing engagement with the circumferential face of the cylindrical portion of the hinge post in the preferred embodiments of the invention to seal the second portions of the first and second passages from each other. Bearings are carried by the mold arms in engagement with the circumferential face of the cylindrical portion of the hinge post, which preferably is hardened and functions as an inner race of the bearings. Thus, the internal volume of the hinge post in the preferred embodiments of the invention is entirely available to formation of the fluid flow passages that extend through the hinge post.

The hinge post has a lower end portion that is secured to a mold support bracket or other suitable fixed structure on the section box of each machine section. This lower end portion of the hinge post preferably is of tapering conical construction and is self-centering in the support bracket. The hinge post may be either secured to the support bracket and the mold arms removably mounted from the hinge post, or the hinge post and mold arms may be removable as an assembly from the mold support bracket. The coolant fluid source and return may be secured to the lower axial end of the hinge post, or may be coupled to the hinge post by means of fluid passages in the mold support bracket.

BRIEF DESCRIPTION OF THE DRAWINGS

The invention, together with additional objects, features and advantages thereof, will be best understood from the following description, the appended claims and the accompanying drawings in which:

DETAILED DESCRIPTION OF PREFERRED EMBODIMENTS

The disclosures of above-noted U.S. application Ser. No. 09/400,123 filed Sep. 20, 1999 and Ser. No. 09/531,049 filed Feb. 24, 2000, both assigned to the assignee hereof, are incorporated herein by reference for purposes of background.

Figure 1:
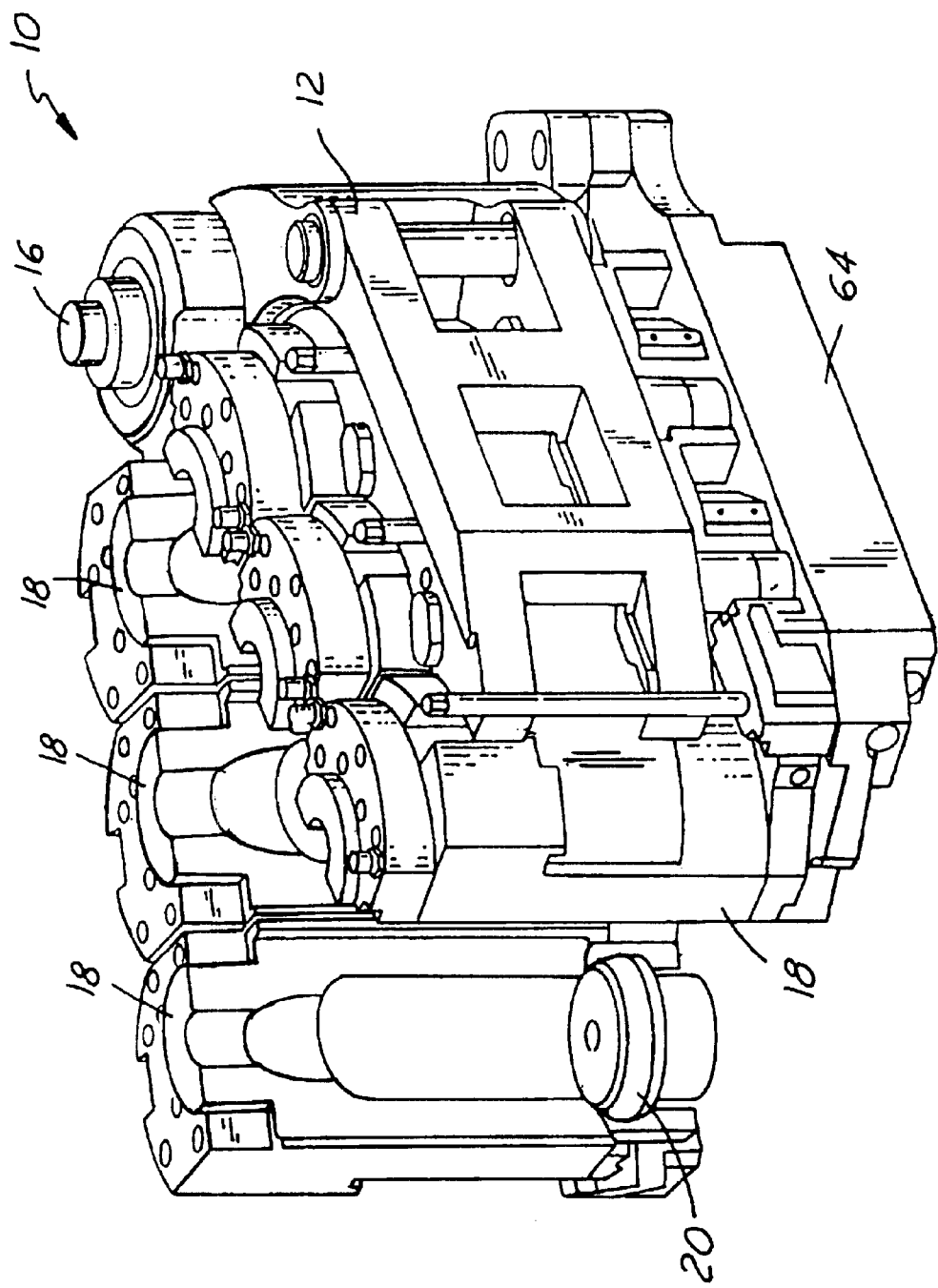
FIG. 1 is a fragmentary perspective view of a blow mold station in an individual section machine equipped with a system for cooling the blow mold parts in accordance with a presently preferred embodiment of the invention.
Figure 2:
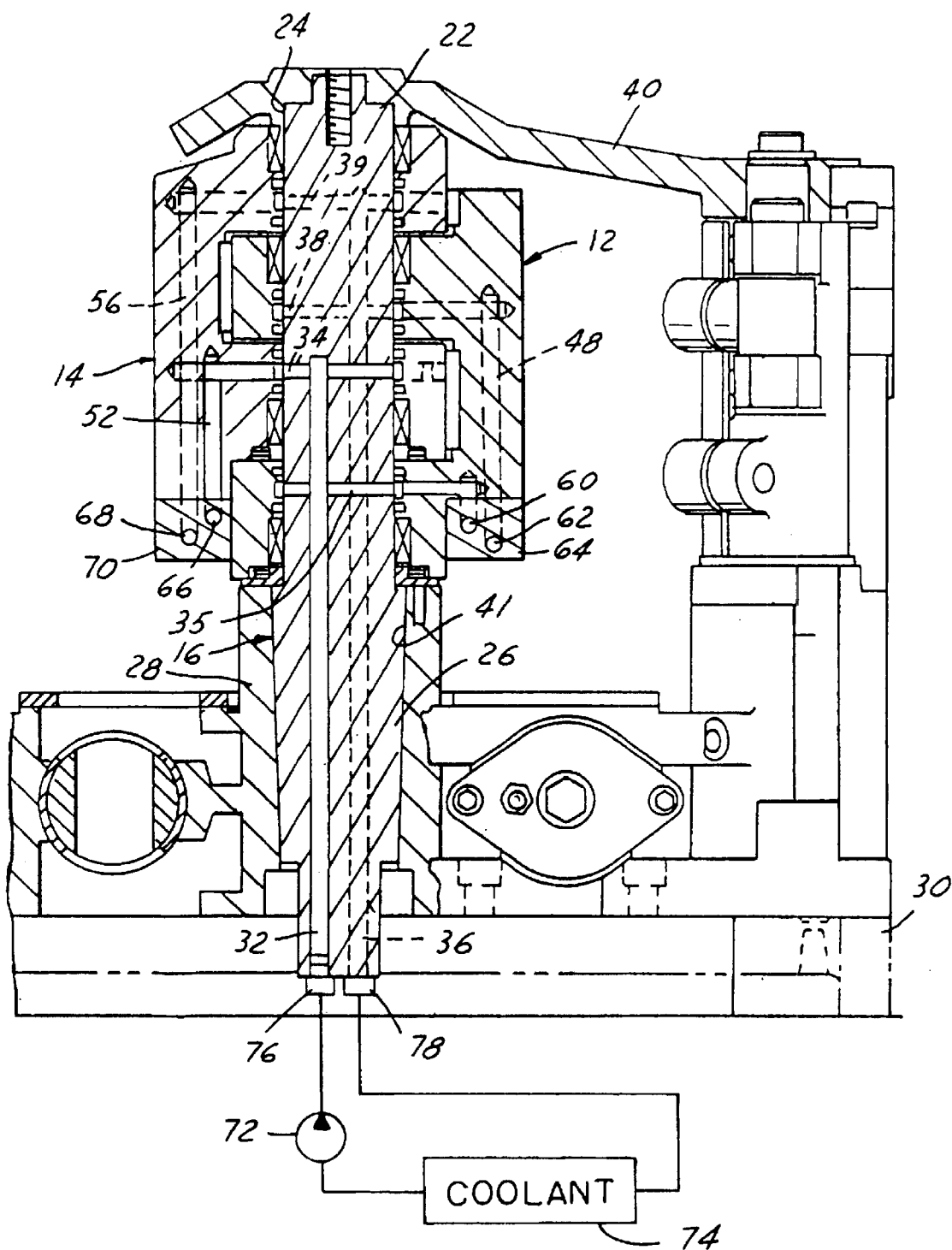
FIG. 2 is a fragmentary sectional view of the blow mold station illustrated in FIG. 1 taken through the hinge post that mounts the blow mold arms.

FIGS. 1 and 2 illustrate a portion of a blow mold station 10 of one section of an individual section glassware forming machine equipped with a mold coolant delivery system in accordance with one presently preferred embodiment of the present invention. A pair of mold arms 12, 14 are pivotally mounted on a stationary hinge post 16. Each mold arm carries a plurality of mold halves or parts 18. Each mold part 18 is adapted to cooperate with an opposing mold part carried on the opposing mold arm to form a mold cavity for molding an article of glassware. The presently preferred embodiments of the invention are illustrated in connection with a blank mold station 10, in which each pair of mold parts 18 cooperate with a bottom mold element 20 and with each other to form a blow mold cavity. It will be understood, however, that the coolant delivery system in accordance with the present invention is equally useful for cooling the blank molds at the blank mold station of an IS machine, either in a linear machine or a rotary machine. It will also be appreciated that, although station 10 is illustrated in FIG. 1 as a station for a so-called triple gob IS machine, comprising three pairs of mold parts 18, the present invention is equally useful in conjunction with so-called single, double, quad and other types of glassware forming machines.

Figures 3, 3A:
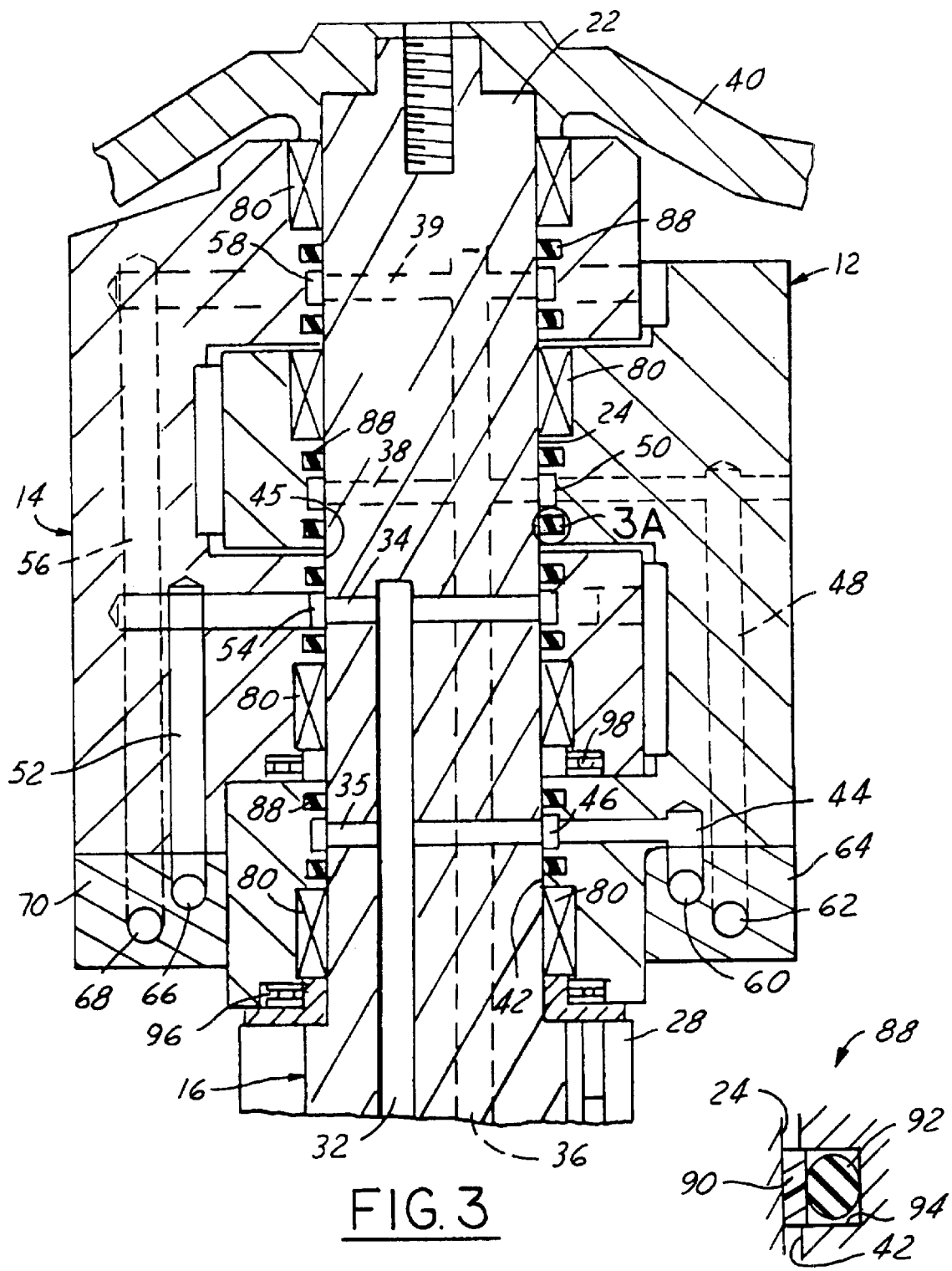
FIG. 3 is a fragmentary sectional view on an enlarged scale of a portion of the blow mold station illustrated in FIG. 2.
FIG. 3A is a fragmentary view on an enlarged scale of the portion of FIG. 3 within the circle 3A.

Referring to FIGS. 2 and 3, hinge post 16 includes a substantially cylindrical upper portion 22 with a cylindrical outer surface 24 on which mold arms 12, 14 are pivotally mounted, and a tapering conical lower portion 26 mounted within a mold arm support bracket 28 secured to the section box 30 of an individual section machine section. A first liquid coolant passage 32 extends axially through lower portion 26 of hinge post 16 into upper portion 22, and then laterally at 34 and 35 to surface 24 of upper hinge post portion 22. Likewise, a second liquid coolant passage 36 extends axially through lower portion 26 of hinge post 16 into upper portion 22, and then laterally at 38 and 39 to surface 24 of upper portion 22. The outlet ends of transverse or lateral liquid coolant passages 34, 35, 38, 39 are spaced from each other longitudinally of hinge post 16. Lateral passages 34, 35 are illustrated in FIGS. 2 and 3 as lying in a plane, although this is not necessary. The same is true for lateral passages 38, 39. The tapering geometry of lower hinge post portion 26 renders the hinge post self-centering and self-aligning in the corresponding opening 41 of mold support bracket 28. An anti-deflection bracket 40 is rotationally carried by mold support bracket 28 for engaging the upper end portion 22 of hinge post 16 and holding the hinge post in position with respect to support bracket 28.

Mold arm 12 includes a cylindrical bore 42 axially received over cylindrical upper portion 22 of hinge post 16. An inlet liquid coolant flow passage 44 in mold arm 12 extends to a circumferential channel 46 around bore 42 in radial and axial alignment in assembly with the outer ends of lateral passage 35 in hinge post 16. An outlet liquid coolant flow passage 48 in mold arm 12 extends to a circumferential channel 50 around bore 42 of mold arm 12 in axial registry and radial alignment with the ends of lateral passage 38 in hinge post 16. Likewise, mold arm 14 includes an inlet liquid coolant flow passage 52 coupled to a circumferential channel 54 around a cylinder bore 45 in axial and radial alignment with the ends of lateral passage 34 in hinge post 16, and an outlet passage 56 coupled to a circumferential channel 58 in axial and radial alignment with lateral liquid coolant passage 39 in hinge post 16. Circumferential channels 46, 50, 54, 58 extend entirely around internal bores 42, 45 of mold arms 12, 14 and maintain fluid communication among the passages independent of pivotal position of mold arms 12, 14 around hinge post 16.

Figures 4, 6:
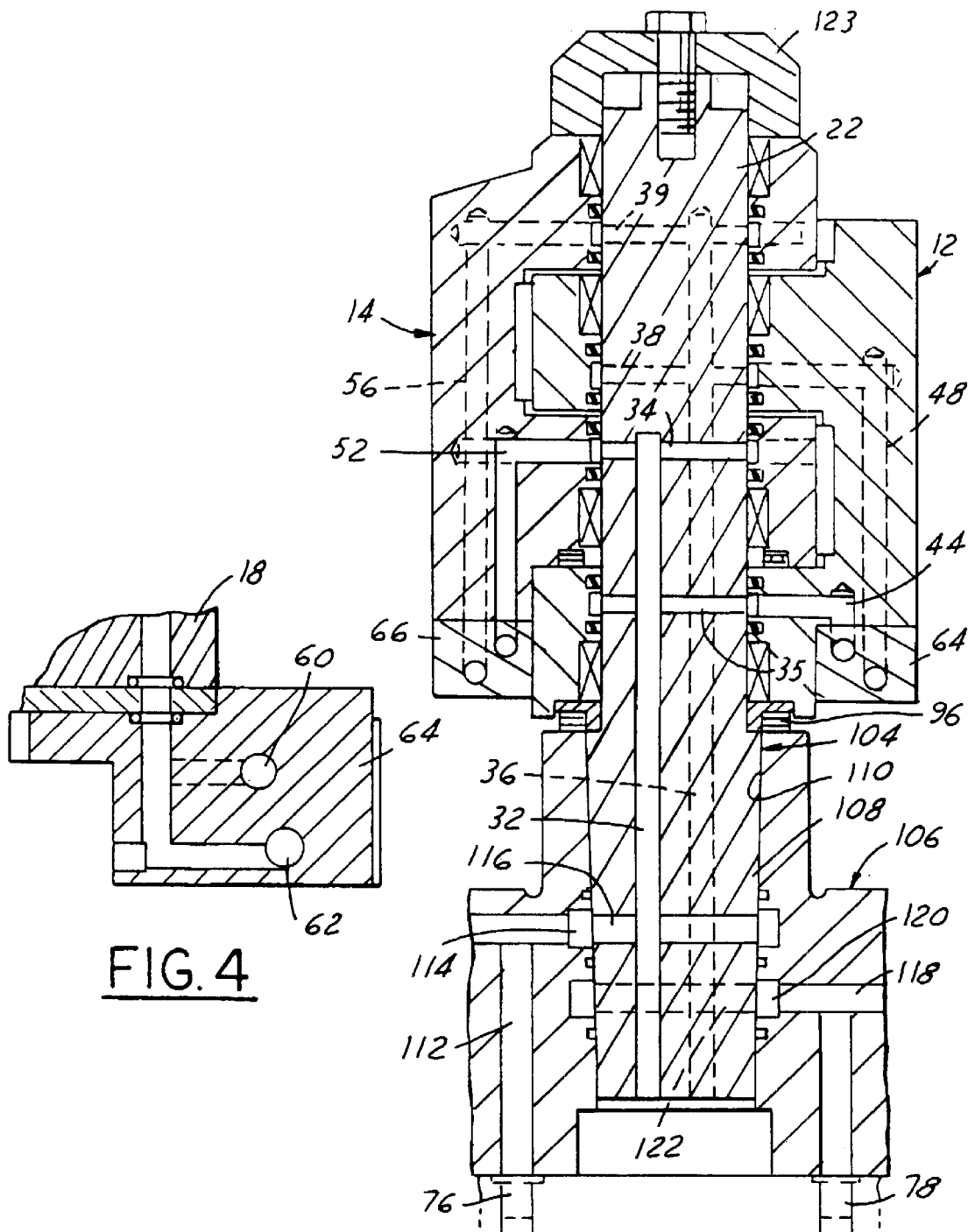
FIG. 4 is a fragmentary sectional view that illustrates coupling of the coolant manifold to the blow mold parts in the blow mold station of FIG. 1.
FIG. 6 is a fragmentary sectional view on an enlarged scale of a portion of a blow mold station illustrating a modified embodiment of the invention.

In the preferred embodiments of the invention illustrated in the drawings, inlet passages 44 and outlet passages 48 in mold arm 12 are L-shaped passages that connect with a pair of respective passages 60, 62 in a manifold 64 (FIGS. 1–3) carried along the lower edge of mold arm 12. Likewise, inlet passages 52 and outlet passages 56 in mold arm 14 are L-shaped passages that connect with passages 66,68 in a manifold 70 carried along the lower edge of mold arm 14. Passages 60, 62 in manifold 64 and passages 66, 68 in manifold 70 extend longitudinally through the respective manifolds, and are connected to corresponding inlet and outlet ports of liquid coolant passages in mold parts 18, as best seen in FIG. 4. The manner of connection of the manifolds to the mold parts is more fully discussed in above-referenced application Ser. No. 09/531,049. In the particular embodiment illustrated in FIGS. 2–3, first and second passages 32, 36 in hinge post 16 terminate at the axially lower end of the hinge post. A liquid coolant pump 72 is connected to a reservoir 74 for feeding liquid coolant under pressure to a fitting 76 at the lower end of passage 32, and reservoir 74 receives return liquid coolant from a fitting 78 at the lower end of passage 36. Thus, liquid coolant is fed under pressure through passage 32 to lateral passages 34, 35, and thence to passages 60, 66 in manifolds 64, 70. The liquid coolant is fed through the manifolds to the mold parts, and return coolant is fed from the mold parts to passages 62, 68 of the manifolds. This return coolant is fed through passages 48, 56 in mold arms 12, 14 and passages 38, 39 in hinge post 16 to return passage 36 within the hinge post, and thence to coolant sump 74 (FIG. 2). It will be appreciated, of course, that pump 72 and reservoir 74 are normally positioned remotely of the machine section, and are connected to the fittings 76, 78 of all sections by appropriate source and return plumbing running through the section boxes.

Figure 5:
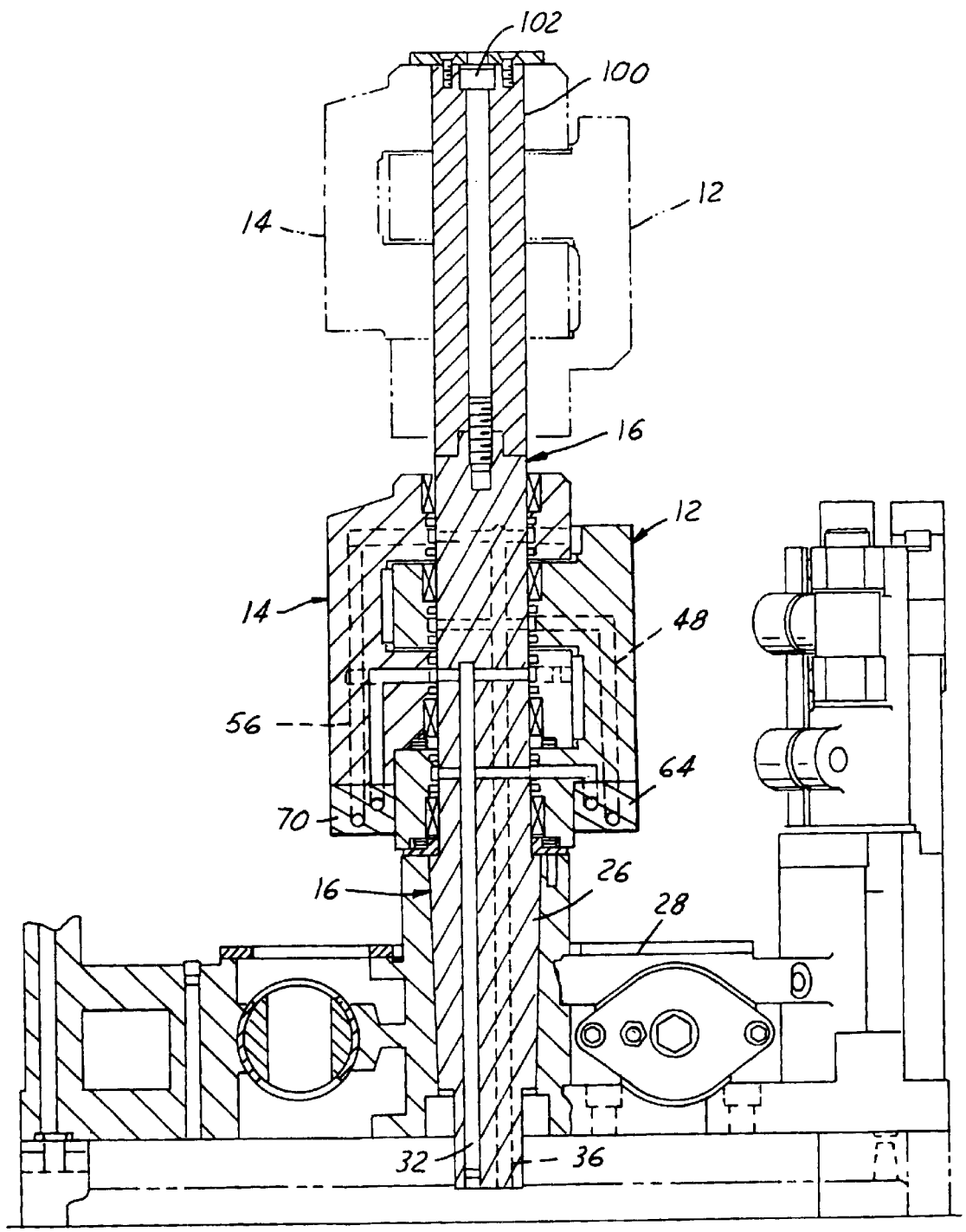
FIG. 5 is a sectional view similar to that of FIG. 2 but showing the manner of disassembling the mold arms.

Mold arm 12 is pivotally supported on hinge post 16 by a pair of longitudinally spaced roller bearings 80 that encircle and engage outer surface 24 of upper hinge post portion 22. Likewise, mold arm 14 is pivotally supported on hinge post 16 by a pair of longitudinally spaced roller bearings 80. Bearings 80 encircle and engage outer surface 24 of upper hinge post portion 22. Surface 24 preferably is hardened, and forms the inner race of the several respective bearings. A pair of seals 88 are carried by the mold arms on axially opposed sides of each coolant lateral passage channel 46, 54, 50, 58. Each seal 88 includes an annular seal member 90 (FIG. 3A) of bearing material such as Teflon, and a resilient O-ring 92 disposed in a channel 94 within the bores 42, 45 of the mold arms. An additional passage may be provided in hinge post 16 for drainage of fluid that leaks past the respective seals, if desired. Mold arm 12 is axially pivotally supported, by a shoulder on hinge post 16 and by mold support bracket 28, by means of a set 96 of needle bearings and thrust washers. Likewise, mold arm 14 is axially and pivotally supported on mold arm 12 by means of a set of needle bearings and thrust washers 98. In the embodiment of FIG. 3, mold arms 12, 14 are removable from hinge post 16 while hinge post 16 remains secured to mold support bracket 28. The technique for removing the mold arms is illustrated in FIG. 5. Anti-deflection bracket 40 is removed from hold-down engagement with the upper end of hinge post 16 (FIGS. 2 and 3), and a temporary post 100 is secured by means of a bolt 102 to the upper end of hinge post 16. Post 100 has the same outer diameter as upper portion 22 of post 16. With temporary post 100 in place, mold arms 12, 14 may be axially removed from hinge post 16 by sliding the mold arms as a unit upwardly onto post 100, clamping the mold arms in position, and then removing post 100 from the upper end of hinge post 16. A new set of mold arms and associated temporary post may then be positioned over hinge post 16, and the molds slid downwardly onto hinge post 16 and secured in operating position by bracket 40.

FIG. 6 illustrates an alternative embodiment of the invention, in which mold arms 12, 14 and a hinge post 104 are removable as an assembly from the mold arm support bracket 106. Mold arms 12, 14 with manifolds 64, 66 are the same as in the prior embodiment. Hinge post 104 has a cylindrical upper portion 22 as in the prior embodiment, and a conical lower portion 108 that is received within a conical opening 110 of bracket 106. In this embodiment, bracket 106 includes an inlet fluid passage 112 that opens to a circumferential channel 114 surrounding opening 110 for axial and radial registry in assembly with a cross-passage 116 coupled to first fluid passage 32 of hinge post 104. Likewise, bracket 106 includes a second fluid passage 118 that opens to a circumferential channel 120 around opening 110 for axial and radial registry with a cross-passage 122 in lower hinge post portion 108 coupled to second passage 36 in the hinge post. Thus, in this embodiment, passages 112, 116 in mold support bracket 106 are connected through fittings 76,78 to the source and return of liquid coolant, and couple the source and return coolant to passages 32, 36 in hinge post 104. (This technique for connecting the source and return coolant to the hinge post may also be employed in the embodiment of FIGS. 2–5.) The assembly of the mold arms and the hinge post may be removed from bracket 106 using a clamp tool 123 and lifting the mold arm and hinge post subassembly from the mold support bracket. A new mold arm and hinge post subassembly may then be inserted into opening 110 and automatically make fluid communication with passages 112, 118 in bracket 106.

Figure 7:
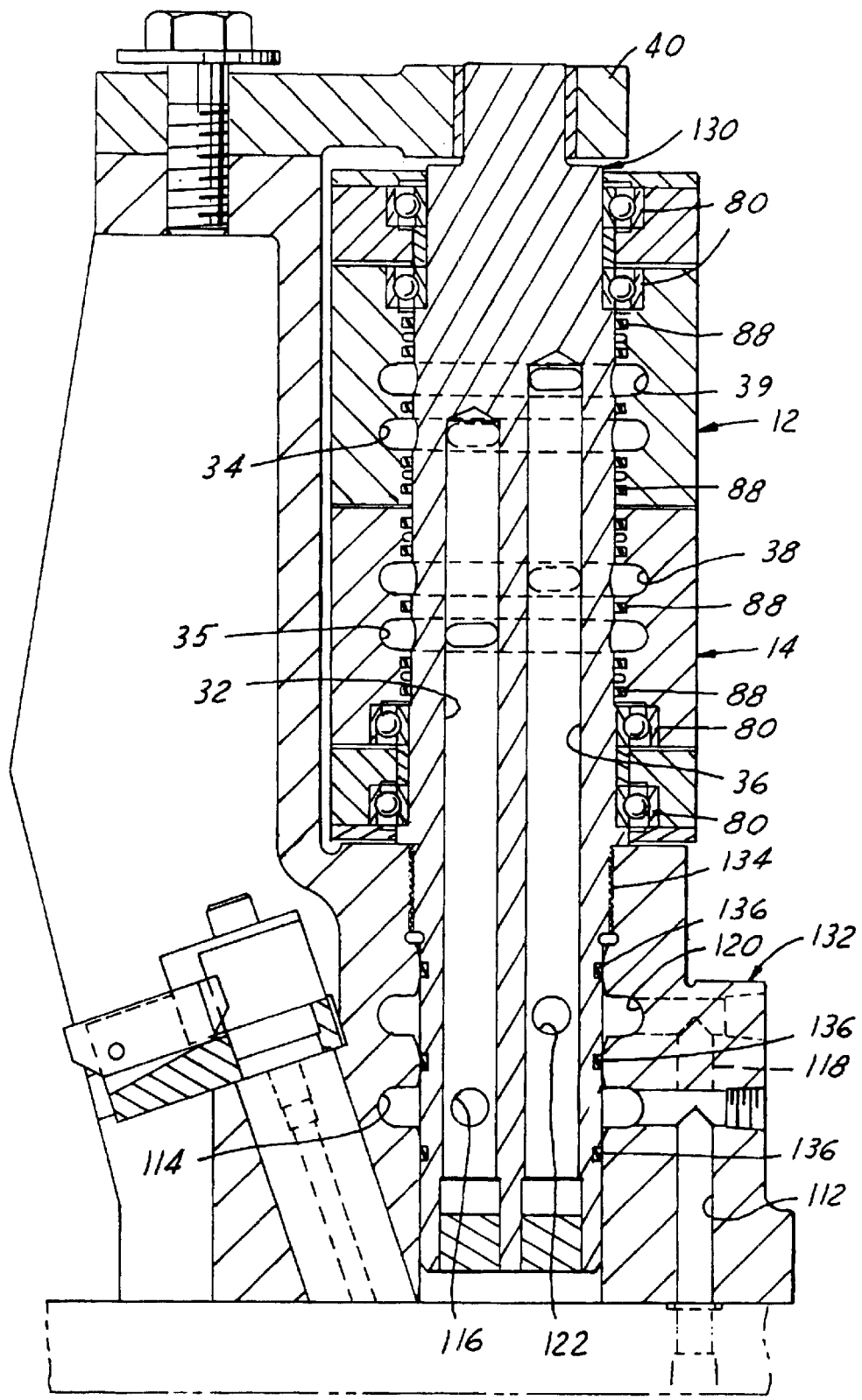
FIG. 7 is a fragmentary sectional view of a further embodiment of the invention.

FIG. 7 illustrates a modification to the embodiment of FIG. 6, in which the hinge post 130 is secured to mold support bracket 132 by threads 134. Channels 114, 120 are isolated from each other by seals 136 carried by the hinge post.

There have thus been disclosed a method and system for cooling molds in a glassware forming machine that fully satisfy all of the objects and aims previously set forth. The invention has been disclosed in conjunction with two presently preferred embodiments, and a number of modifications and variations have been discussed. Other modifications and variations will readily suggest themselves to persons of ordinary skill in the art in view of the foregoing description.

For example, although the preferred embodiments of the invention contemplate manifolds secured beneath the mold arms for passage of coolant to and from the mold parts, the fluid passages could be formed longitudinally through the mold arms to provide direct communication with the mold parts without requiring such a manifold. Use of the manifold is currently preferred because it does not require provision of passages through the mold arms, maintaining strength of the mold arms required for supporting the mold parts. The invention is intended to embrace all such modifications and variations as fall within the spirit and broad scope of the appended claims.

What is claimed is:

1. A system for cooling molds in a glassware forming machine, which comprises:
   a pair of mold arms mounted on a hinge post for movement toward and away from each other,
   at least one mold part carried by each said arm and adapted to cooperate with each other for form a glassware mold,
   each of said mold parts including at least one coolant passage having an inlet and an outlet disposed at one end of said mold part, and each said mold arm having inlet and outlet coolant flow passages operatively coupled to said inlet and said outlet of said at least one mold part,
   a liquid coolant source and a liquid coolant return disposed adjacent to said hinge post, and
   a first coolant passage extending through said hinge post between said liquid coolant source and said inlet flow passages in said mold arms, and a second coolant passage extending through said hinge post between said outlet coolant flow passages in said mold arms and said liquid coolant return,
   such that liquid coolant flows in a closed path from said source through said hinge post and said mold arms to said mold parts, and from said mold parts through said mold arms and said hinge post to said return.

2. The system set forth in claim 1 wherein said hinge post includes an elongated cylindrical portion on which said mold arms are pivotally mounted, wherein both of said first and second coolant passages include a first portion that extends axially through said hinge post and a second portion that extends radially to a circumferential face of said cylindrical portion, and wherein said inlet and outlet coolant flow passages in said mold arms include portions in radial alignment with said second portions of said first and second coolant passages.

3. The system set forth in claim 2 wherein said mold arms include a coolant manifold carried by each mold arm, said inlet and outlet coolant passages extending through said mold arm from said hinge post to said manifolds, and thence through said manifold to said mold parts.

4. The system set forth in claim 2 further comprising seals carried by said mold arms in sealing engagement with said circumferential portion of said hinge post to seal said second portions of said first and second passages from each other.

5. The system set forth in claim 4 further comprising bearings carried by said mold arms in engagement with said circumferential portion of said hinge post.

6. The system set forth in claim 1 wherein said hinge post has an end portion secured to a mold support bracket.

7. The system set forth in claim 6 wherein said hinge post end portion is conically tapering and self-centering.

8. The system set forth in claim 6 wherein said hinge post is secured to said mold support bracket, and said mold arms are removably mounted on said hinge post.

9. The system set forth in claim 8 further comprising a temporary post for removable securement to an upper end of said hinge post so that said mold arms may be removed from said hinge post onto said temporary post.

10. The system set forth in claim 6 wherein said hinge post and said mold arms are removable as an assembly from said mold support bracket.

11. The system set forth in claim 6 wherein said coolant source and return include source and return connections to an axial end of said hinge post within said mold support bracket.

12. The system set forth in claim 6 wherein said first and second coolant passages in said hinge post include portions that extend laterally to said mold support bracket, and portions in said mold support bracket for connection to said source and return.

13. A method of cooling molds in a glassware forming machine, which comprises the steps of:
   (a) mounting a pair of mold parts on associated mold arms for cooperation with each other to form a glassware mold, each of said mold parts including at least one coolant passage having an inlet and an outlet, and each said mold arm including inlet and outlet coolant flow passages operatively coupled to said inlet and said outlet of said mold parts,
   (b) mounting said mold arms on a hinge post for pivoting said mold arms and said mold parts toward and away from each other, said hinge post having first and second coolant passages respectively coupled to said inlet and outlet passages of said mold arms, and
   (c) circulating liquid coolant through said hinge post and said mold arms to and from said mold parts.

* * * * *